United States Patent
Shirokane

(10) Patent No.: US 9,994,129 B1
(45) Date of Patent: Jun. 12, 2018

(54) SEATBACK LATCH

(71) Applicant: Toyo Seat USA Corp, Imlay City, MI (US)

(72) Inventor: Hideki Shirokane, Imlay City, MI (US)

(73) Assignee: Toyo Seat USA Corp, Imlay City, MI (US)

( * ) Notice: Subject to any disclaimer, the term of this patent is extended or adjusted under 35 U.S.C. 154(b) by 0 days. days.

(21) Appl. No.: 15/450,846

(22) Filed: Mar. 6, 2017

(51) Int. Cl.
  *B60N 2/36* (2006.01)
  *B60N 2/22* (2006.01)
  *B60N 2/20* (2006.01)
  *B60N 2/30* (2006.01)

(52) U.S. Cl.
  CPC ........... *B60N 2/2245* (2013.01); *B60N 2/206* (2013.01); *B60N 2/3011* (2013.01)

(58) Field of Classification Search
  CPC ..... B60N 2/2245; B60N 2/206; B60N 2/3011
  USPC .................................................. 297/378.13
  See application file for complete search history.

(56) References Cited

U.S. PATENT DOCUMENTS

| | | | | |
|---|---|---|---|---|
| 2,777,721 A | * | 1/1957 | Burke ................. | E05B 65/0046 292/216 |
| 3,905,624 A | * | 9/1975 | Fujita ..................... | E05B 83/16 292/11 |
| 5,154,460 A | * | 10/1992 | Bartsch ................... | E05B 83/36 292/216 |
| 5,769,468 A | * | 6/1998 | Armbruster ............. | E05B 81/20 292/201 |
| 6,945,585 B1 | * | 9/2005 | Liu ..................... | B60N 2/01583 292/216 |
| 7,404,605 B2 | * | 7/2008 | Inoue ..................... | B60N 2/224 297/378.13 X |
| 7,762,605 B2 | * | 7/2010 | Otsuka ............... | B60N 2/01583 297/378.13 X |
| 8,128,135 B2 | * | 3/2012 | Maeta ................. | B60N 2/01583 297/378.13 X |
| 8,544,931 B2 | * | 10/2013 | Park ................... | B60N 2/01583 297/378.13 X |
| 8,684,464 B2 | * | 4/2014 | Muller ............... | B60N 2/01583 297/378.13 X |
| 8,905,475 B2 | * | 12/2014 | Schenten ............. | B60N 2/2245 297/378.13 X |

(Continued)

FOREIGN PATENT DOCUMENTS

JP 6033666 B2 11/2016
JP 6039289 B2 12/2016

*Primary Examiner* — Rodney B White
(74) *Attorney, Agent, or Firm* — Quinn IP Law

(57) ABSTRACT

A seatback latch mechanism includes a cover. A lever member is rotatably supported by the cover for rotation about a lever axis, and presents a blocking surface. A hook member is rotatably supported by the cover for rotation about a hook axis, and includes a pin. An auxiliary hook member is rotatably supported by the cover for rotation about the hook axis. The auxiliary hook member defines a slot, with the pin extending through the slot. The slot limits movement of the pin to limit relative movement between the hook member and the auxiliary hook member. The auxiliary hook member includes a blocking portion, which is operable to engage the blocking surface on the lever member. The blocking portion engages the blocking surface to limit rotation of the auxiliary hook member about the hook axis.

20 Claims, 10 Drawing Sheets

(56) References Cited

U.S. PATENT DOCUMENTS

| | | | | |
|---|---|---|---|---|
| 8,950,810 B2* | 2/2015 | Dryburgh | ............ | B60N 2/01583 |
| | | | | 297/378.13 X |
| 9,039,048 B2* | 5/2015 | Muller | ................ | B60N 2/01583 |
| | | | | 292/216 |
| 9,199,554 B2* | 12/2015 | Muller | ................ | B60N 2/01583 |
| 9,255,429 B2* | 2/2016 | Kim, II | ................... | E05B 83/24 |
| 9,493,097 B2* | 11/2016 | Pejathaya | ............. | B60N 2/3011 |
| 2005/0194792 A1* | 9/2005 | Lomicka | ............. | E05B 15/0053 |
| | | | | 292/96 |
| 2007/0200411 A1* | 8/2007 | Inoue | ................... | B60N 2/2245 |
| | | | | 297/378.13 |
| 2008/0238109 A1* | 10/2008 | Huang | ................. | E04B 1/6183 |
| | | | | 292/95 |
| 2012/0193963 A1* | 8/2012 | Lutzka | ................... | B60N 2/366 |
| | | | | 297/378.13 |
| 2013/0328372 A1* | 12/2013 | Suzumura | .............. | B60N 2/366 |
| | | | | 297/378.13 |
| 2016/0152159 A1* | 6/2016 | Gordeenko | ........ | B60N 2/01583 |
| | | | | 297/378.13 |

* cited by examiner

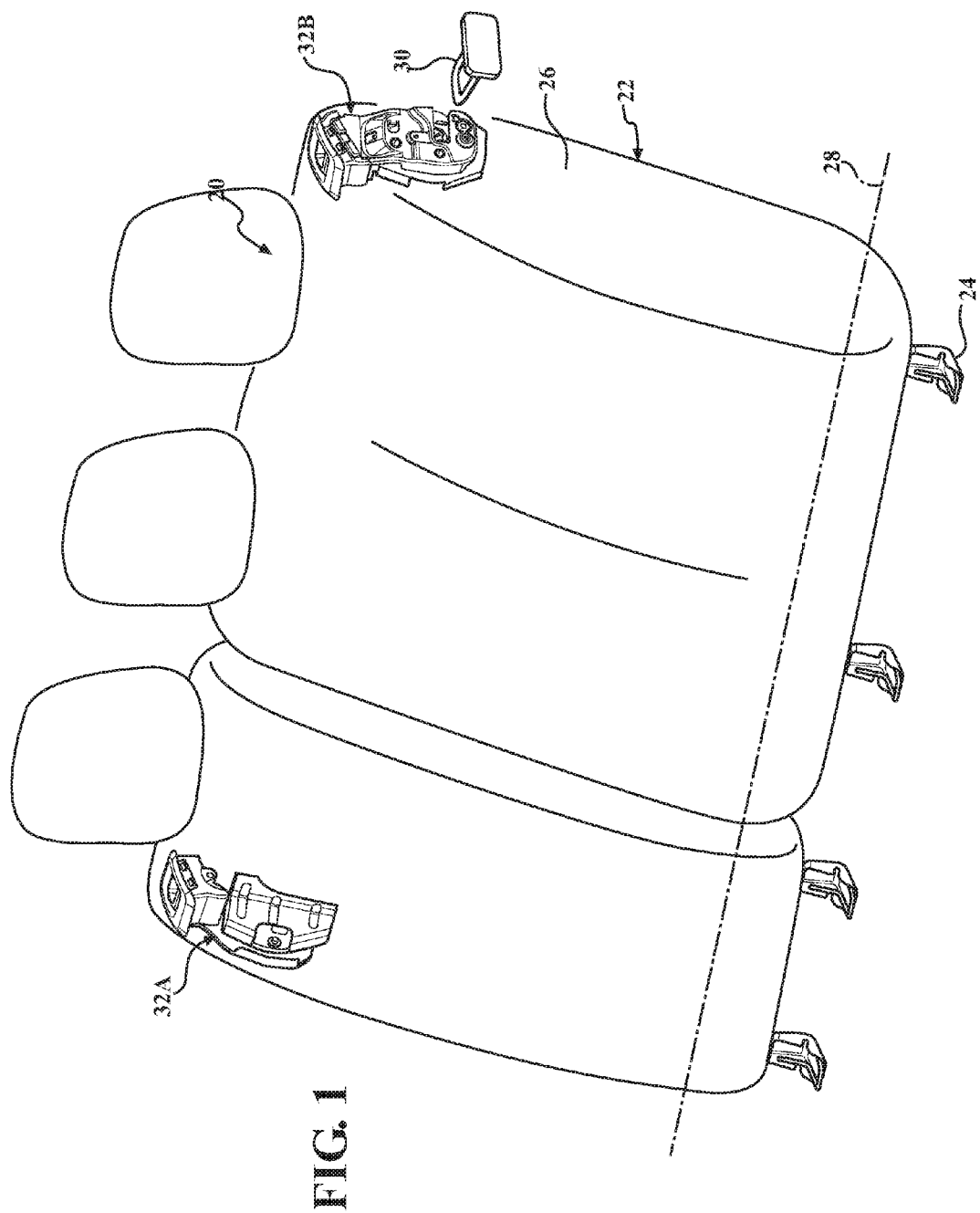

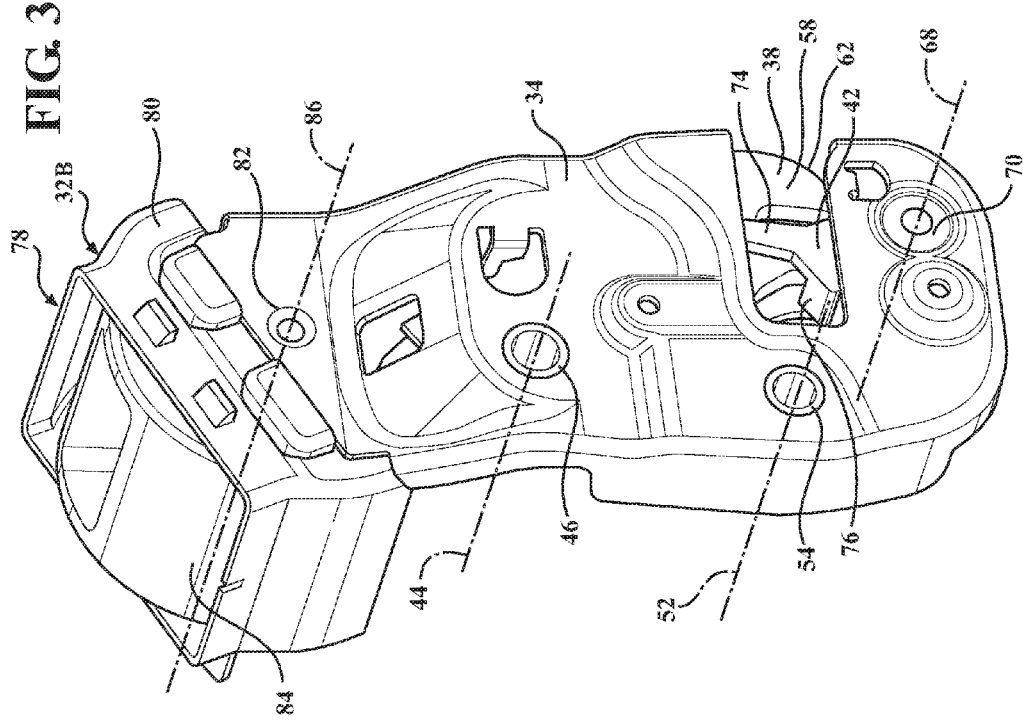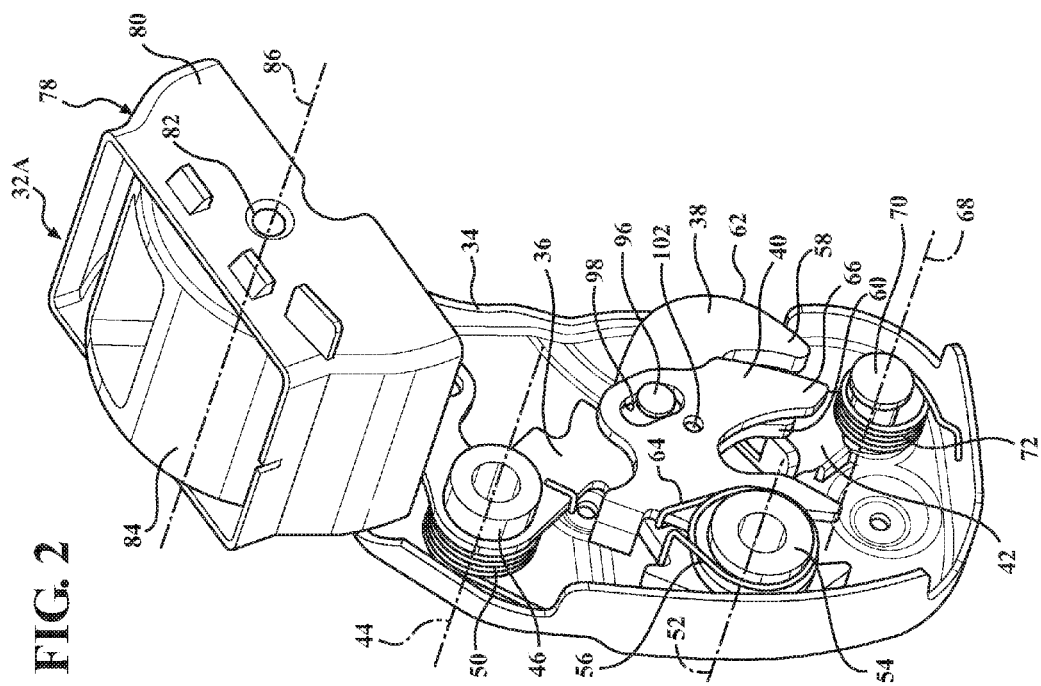

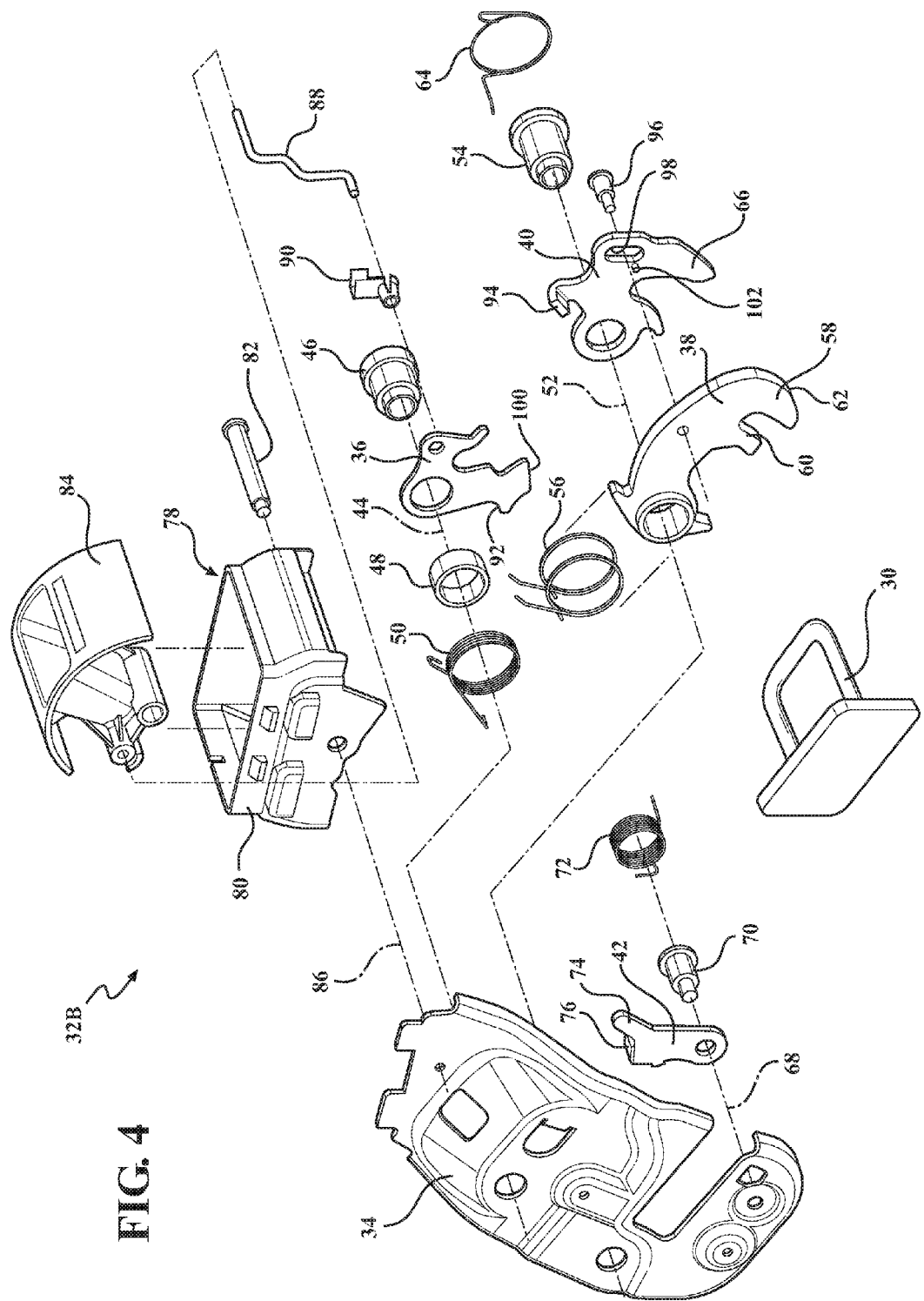

SEATBACK LATCH

TECHNICAL FIELD

The disclosure generally relates to an adjustable seat system, and more specifically to a seatback latch mechanism for the seat system.

BACKGROUND

A seat system, such as but not limited to a rear seat in a vehicle, often includes a seatback having a seatback latch mechanism that latches the seatback to a striker. The seatback latch mechanism may be actuated to release the seatback latch from the striker, thereby allowing the seatback to be folded downward into a generally flat position. Some seatback latch mechanisms are operable to engage the striker in two distinct seatback positions, e.g., a first or generally upright seatback position, and a second or rearward leaning seatback position. The first seatback position and the second seatback position secure the seatback at a different angle relative to a seat bottom. When the seatback is positioned in the generally flat position, the seatback may be moved into the first seatback position by simply rotating the seatback upward and pressing the seatback against the striker. The seatback latch mechanism should engage the striker in the first seatback position, and prevent the seatback from continued motion into the second seatback position. In order to move the seatback into the second seatback position, the seatback latch mechanism should be manually actuated to release the striker and allow the seatback to move closer toward the striker, in order to position the striker deeper within the seatback latch mechanism and secure the seatback to the striker in the second seatback position.

SUMMARY

A seatback latch mechanism is provided. The seatback latch mechanism includes a cover. A lever member is rotatably supported by the cover. The lever member is rotatable about a lever axis, and presents a blocking surface. A hook member is rotatably supported by the cover. The hook member is rotatable about a hook axis, and includes a pin. An auxiliary hook member is rotatably supported by the cover. The auxiliary hook member is rotatable about the hook axis. The auxiliary hook member defines a slot, with the pin extending through the slot. The slot limits movement of the pin to limit relative movement between the hook member and the auxiliary hook member. The auxiliary hook member includes a blocking portion, which is operable to engage the blocking surface on the lever member. The blocking portion engages the blocking surface to limit rotation of the auxiliary hook member about the hook axis.

In one aspect of the seatback latch mechanism, the blocking portion contacts the blocking surface at a contact interface. A line extending substantially tangent to an arcuate path defined by the rotational movement of the auxiliary hook member about the hook axis, passes through the contact interface and intersects the lever axis.

In another aspect of the seatback latch mechanism, the lever member may define a ledge and the auxiliary hook member may include a tab. The tab engages the ledge such that rotational movement of the lever member about the lever axis rotates the auxiliary hook member about the hook axis.

The seatback latch mechanism may be incorporated into a seat system. The seat system includes a seat structure having a seatback. The seatback is rotatable about a seat axis. A striker is fixed in position relative to the seat structure, with the seatback moveable relative to the striker. The seatback latch mechanism is attached to the seatback. The seatback latch mechanism is operable to engage the striker in interlocking engagement in one of a first seatback position or a second seatback position.

Accordingly, the engagement of the blocking portion on the auxiliary hook member with the blocking surface on the lever member, when the lever member is in a partially actuated position, prevents the auxiliary hook member from moving into a respective fully open position. The hook member is also prevented from moving into a respective fully open position due to the engagement between the pin within the slot. Preventing the hook member and the auxiliary hook member from moving into their respective fully open positions prevents the striker from moving beyond a first seatback position without manually actuating the seatback latch mechanism. Therefore, the seatback cannot be moved into a second seatback position without manually actuating the seatback latch mechanism. Actuation of the seatback latch mechanism releases the engagement between the blocking surface and the blocking portion, and rotates the hook member and the auxiliary hook member into their respective fully open positions, which allows the seatback latch mechanism to move over the striker and into the second seatback position.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic perspective view of an adjustable seat system.

FIG. 2 is a schematic perspective view of a right hand side seatback latch mechanism of the seat system.

FIG. 3 is a schematic perspective view of a left hand side seatback latch mechanism of the seat system.

FIG. 4 is an exploded schematic perspective view of the left hand side seatback latch mechanism.

DETAILED DESCRIPTION

Figure 5:
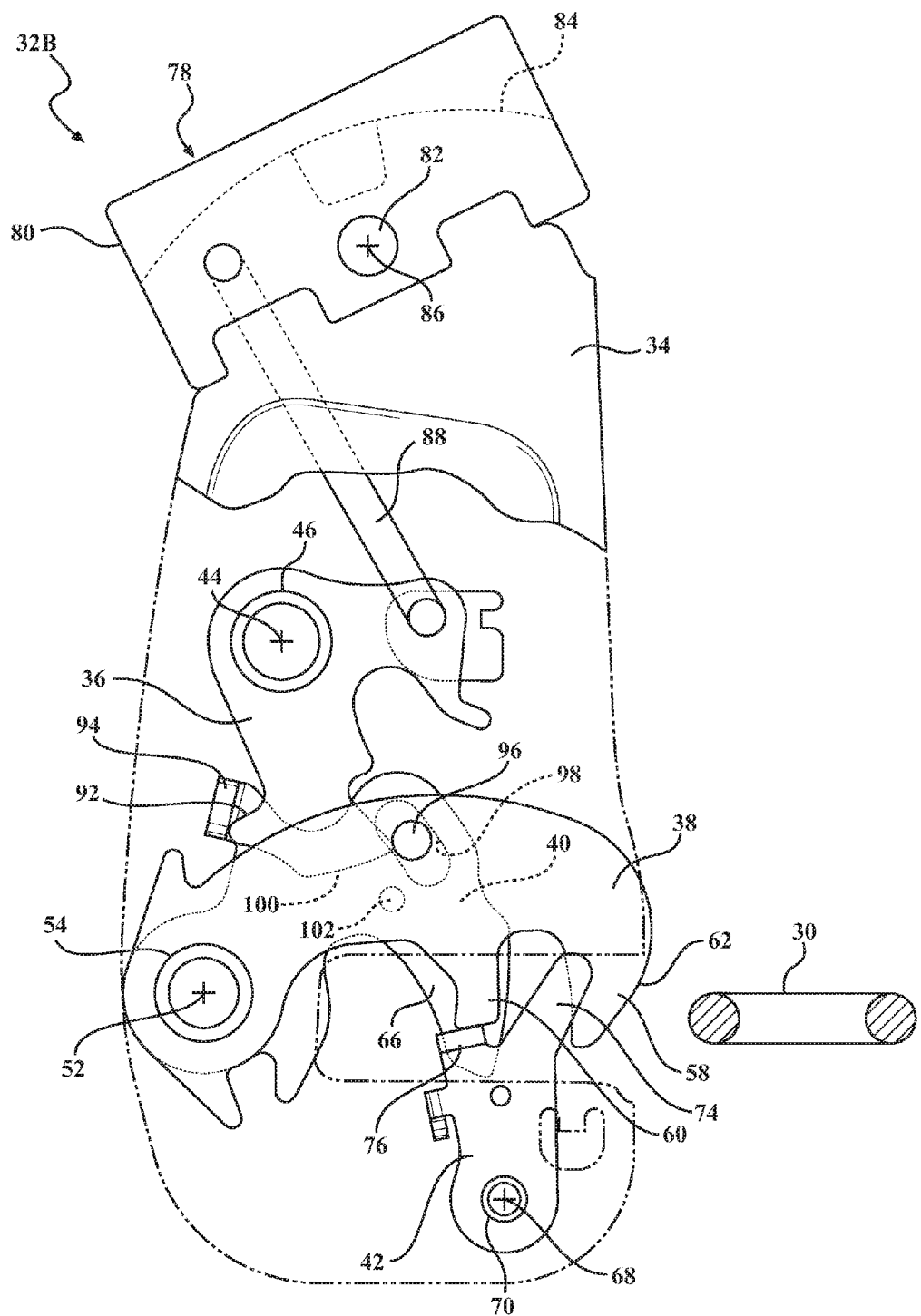
FIG. 5 is a schematic side view of the left hand side seatback latch mechanism showing a lever member in a partially actuated position, a hook member in a partially closed position, an auxiliary hook member in a first partially closed position, and an assist member in a first position.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, an adjustable seat system is generally shown at 20 in FIG. 1. The seat system 20 may be used in a vehicle, such as a rear seat of an SUV. However, it should be appreciated that the seat system 20 may be used at other locations within other types of vehicles. Furthermore, it should be appreciated that the seat system 20 may be used in other types of vehicles and/or other non-vehicle applications. Accordingly, the seat system 20 is not limited to use in a vehicle in general, or a particular style of vehicle.

Referring to FIG. 1, the seat system 20 includes a seat structure 22. The seat structure 22 includes a seatback 26 that is rotatable about a seat axis 28. The seat structure 22 may include a base portion 24 that is configured for attachment to a platform, with the seatback 26 rotatably attached to the base portion 24 for rotation about the seat axis 28. The seatback 26 may be rotated into a generally horizontal position, or may be positioned in one of two generally upright seatback 26 positions, i.e., a first seatback 26 position, or a second seatback 26 position. The seat structure 22 and the seatback 26 may be configured in any suitable manner to satisfy the particular application of the seat system 20. Accordingly, the specific shape, construction, and/or configuration of the seat structure 22, including the seatback 26, are not pertinent to the teachings of this disclosure, and are therefore not described in detail herein.

A striker 30 is fixed in position relative to the seat structure 22, with the seatback 26 moveable relative to the striker 30. The seatback 26 includes a seatback latch mechanism 32A, 32B, which is operable to engage the striker 30 in interlocking engagement in one of the first seatback 26 position or the second seatback 26 position. As shown, the striker 30 includes a generally U-shaped structure having generally parallel arms 74 connected by an end portion. However, it should be appreciated that the striker 30 may be constructed in some other manner and include a shape not shown or described herein. The striker 30 is attached to a support, such as but not limited to a frame structure of a vehicle, and fixed in position relative to the base portion 24 of the seat structure 22, so that the seatback 26 moves relative to the striker 30 as the seatback 26 rotates about the seat axis 28. The striker 30 may be attached to the support in any manner suitable for the particular application.

As shown in FIG. 1, the seat system 20 may include a first seatback latch mechanism 32A disposed on a left hand side of the seat structure 22, and a second seatback latch mechanism 32B disposed on a right hand side of the seat structure 22. The first seatback latch mechanism 32A and the second seatback latch mechanism 32B are mirror images of each other. The second seatback latch mechanism 32B is described in detail below, and is shown in FIGS. 3-11. While the first seatback latch mechanism 32A is not specifically described in detail below, it should be appreciated that the description of the second seatback latch mechanism 32B is applicable to and also describes the first seatback latch mechanism 32A.

Referring to FIG. 4, the second seatback latch mechanism 32B includes a cover 34. The cover 34 operates as a frame or structure to support the different components of the second seatback latch mechanism 32B, and attach the second seatback latch mechanism 32B to the seatback 26. The second seatback latch mechanism 32B includes a lever member 36, a hook member 38, an auxiliary hook member 40, and an assist member 42.

The lever member 36 is rotatably supported by the cover 34, and is rotatable about a lever axis 44. The lever member 36 is rotatable between a fully actuated position shown in FIGS. 9 and 10, a partially actuated position shown in FIGS. 5, 6, and 7, and an unactuated position shown in FIGS. 8 and 11. The lever member 36 may be rotatably attached to the cover 34 in any suitable manner. For example, the exemplary embodiment of the second seatback latch mechanism 32B shown in the Figures and described herein includes a lever rivet 46 extending through the lever member 36 and the cover 34, and includes an expanded end that secures the lever rivet 46 to the cover 34. A lever bushing 48 is disposed between the lever rivet 46 and the lever member 36. A lever spring 50 interconnects the lever member 36 and the cover 34. The lever spring 50 biases against the lever member 36 and the cover 34 to urge the lever member 36 into the unactuated position of the lever member 36. As shown in the exemplary embodiment, the lever member 36 is a planar structure, which is formed from a flat sheet of a rigid material, such as but not limited to a metal material. While the lever member 36 includes a thickness, the lever member 36 does not include any structural features that extend outward, along the lever axis 44, beyond the thickness of the planar structure of the lever member 36. It should be appreciated that the lever member 36 shown and described herein is merely an exemplary embodiment, and that the lever member 36 may be shaped and constructed differently, and attached to the cover 34 in a different manner than shown and described herein.

The hook member 38 is rotatably supported by the cover 34, and is rotatable about a hook axis 52. The hook axis 52 is generally parallel with and laterally spaced from the lever axis 44. The hook member 38 is rotatable between a fully closed position shown in FIGS. 8 and 11, a partially closed position shown in FIG. 5, a partially open position shown in FIG. 6, and a fully open position shown in FIGS. 7, 9, and 10. The hook member 38 may be rotatably attached to the cover 34 in any suitable manner. For example, the exemplary embodiment of the second seatback latch mechanism 32B shown in the Figures and described herein includes a hook rivet 54 extending through the hook member 38 and the cover 34, and includes an expanded end that secures the hook rivet 54 to the cover 34. A hook spring 56 interconnects the hook member 38 and the cover 34. The hook spring 56 biases against the hook member 38 and the cover 34 to urge the hook member 38 into the fully closed position of the hook member 38. The hook member 38 includes a first hook portion 58 and a second hook portion 60. The first hook portion 58 and the second hook portion 60 are radially spaced from each other relative to the hook axis 52. As such, the first hook portion 58 is disposed radially farther from the hook axis 52 than is the second hook portion 60. The first hook portion 58 includes a rounded end surface 62 that guides the hook member 38 into the partially open position when engaged by the striker 30. It should be appreciated that the hook member 38 shown and described herein is merely an exemplary embodiment, and that the hook member 38 may be shaped and constructed differently, and attached to the cover 34 in a different manner than shown and described herein.

The auxiliary hook member 40 is rotatably supported by the cover 34, and is rotatable about the hook axis 52. The auxiliary hook member 40 is rotatable between a fully closed position shown in FIGS. 8 and 11, a first partially closed position shown in FIG. 5, a second partially closed position shown in FIG. 6, and a fully open position shown in FIGS. 9 and 10. FIG. 7 shows the auxiliary hook member 40 in-between the second partially closed position of FIG. 6 and the fully open position of FIGS. 9 and 10. The lever member 36 is disposed between the hook member 38 and the auxiliary hook member 40, along both the hook axis 52 and the lever axis 44. The hook member 38 is disposed between the auxiliary hook member 40 and the cover 34. The auxiliary hook member 40 may be rotatably attached to the cover 34 in any suitable manner. For example, the exemplary embodiment of the second seatback latch mechanism 32B shown in the Figures and described herein includes the hook rivet 54 extending through the auxiliary hook member 40, and securing the auxiliary hook member 40 to the cover 34. An auxiliary hook spring 64 interconnects the auxiliary hook member 40 and the hook member 38. The auxiliary hook spring 64 biases against the auxiliary hook member 40 and the hook member 38 to urge the auxiliary hook member 40 into the fully closed position of the auxiliary hook member 40. The auxiliary hook member 40 includes a secondary hook portion 66 that is generally radially aligned with the second hook portion 60 of the hook member 38 relative to the hook axis 52. As such, the secondary hook portion 66 and the second hook portion 60 are both distanced from the hook axis 52 an approximately equal distance. The auxiliary hook member 40 may be shaped to include an edge or cam profile that biases the striker against the first hook portion 58 to reduce relative movement therebetween. It should be appreciated that the auxiliary hook member 40 shown and described herein is merely an exemplary embodiment, and that the auxiliary hook member 40 may be shaped and constructed differently, and attached to the cover 34 in a different manner than shown and described herein.

The assist member 42 is rotatably supported by the cover 34, and is rotatable about an assist axis 68. The assist member 42 is rotatable between a first position shown in FIG. 5, a second position shown in FIGS. 7, 8, and 9, and a third position shown in FIGS. 10 and 11. FIG. 6 shows the assist member 42 in-between the first position of FIG. 5 and the second position of FIGS. 7, 8, and 9. The assist member 42 may be rotatably attached to the cover 34 in any suitable manner. For example, the exemplary embodiment of the second seatback latch mechanism 32B shown in the Figures and described herein includes an assist rivet 70 extending through the assist member 42 and the cover 34, and includes an expanded end that secures the assist rivet 70 to the cover 34. An assist spring 72 interconnects the assist member 42 and the cover 34. The assist spring 72 biases against the assist member 42 and the cover 34 to urge the assist member 42 into the first position of the assist member 42. The assist member 42 includes an arm 74 that is generally aligned with the first hook portion 58 when the hook member 38 is positioned in the partially closed position and the assist member 42 is positioned in the first position. The assist spring 72 biases the arm 74 against the striker 30, when engaged, to assist in pushing the striker 30 out of the second seatback latch mechanism 32B, and/or pushing the striker 30 against the first hook portion. The assist member 42 may further include a support portion 76 that engages the second hook portion 60 of the hook member 38 when the hook member 38 is positioned in the partially closed position and the assist member 42 is positioned in the first position. Engagement between the support portion 76 and the second hook portion 60 prevents movement of the hook member 38 into the fully closed position. It should be appreciated that the assist member 42 shown and described herein is merely an exemplary embodiment, and that the assist member 42 may be shaped and constructed differently, and attached to the cover 34 in a different manner than shown and described herein.

A handle mechanism 78 is attached to the cover 34, and is operatively coupled to the lever member 36 for selectively rotating the lever member 36 about the lever axis 44. The handle mechanism 78 may be attached to the cover 34 and the lever member 36 in any suitable manner. For example, and as shown in the FIGS, the handle mechanism 78 includes a housing 80 that is attached to the cover 34. A housing rivet 82 extends through the housing 80 and through the cover 34, and includes an enlarged end to secure the housing 80 relative to the cover 34. The cover 34 and the housing 80 may further include one or more interlocking geometric features to secure the housing 80 relative to the cover 34. A handle member 84 is rotatably attached to the housing 80. For example, the handle member 84 may be rotatably attached to the housing 80 by the housing rivet 82, such that the handle member 84 rotates about a handle axis 86 defined by the handle rivet. A linkage 88 may be used to connect the handle member 84 to the lever member 36. A lock clip 90 may be used to secure the linkage 88 to the lever member 36. Rotating the handle member 84 about the handle axis 86 moves the linkage 88 in a downward direction, which causes the lever member 36 to rotate about the lever axis 44. It should be appreciated that the handle mechanism 78 shown and described herein is merely an exemplary embodiment, and that the handle mechanism 78 may be constructed differently, and attached to the cover 34 and/or the lever member 36 in a different manner than shown and described herein.

As shown in the exemplary embodiment of the second seatback latch mechanism 32B, the lever member 36 defines a ledge 92 and the auxiliary hook member 40 includes a tab 94. The tab 94 is engaged with the ledge 92 in abutting contact. Rotational movement of the lever member 36 about the lever axis 44, such as when actuated by the handle mechanism 78, rotates the auxiliary hook member 40 about the hook axis 52.

The hook member 38 includes a pin 96 that extends outward from the hook member 38, in a generally parallel relationship with the hook axis 52. The pin 96 is laterally spaced from the hook axis 52. The auxiliary hook member 40 defines a slot 98. The slot 98 is laterally spaced from the hook axis 52, and extends in a generally tangential relationship relative to the hook axis 52. The pin 96 extends through the slot 98 and is moveable within the slot 98. However, the slot 98 limits movement of the pin 96. In other words, the slot 98 defines a boundary or limit to the relative movement between the pin 96 and the auxiliary hook member 40. The interaction or engagement between the slot 98 and the pin 96 limits the relative movement between the hook member 38 and the auxiliary hook member 40.

The lever member 36 presents a blocking surface 100. As noted above, the lever member 36 is a planar structure having a thickness, the blocking surface 100 may include an edge of the planar structure defined by the thickness of lever member 36. The auxiliary hook member 40 includes a blocking portion 102 that is operable to engage the blocking surface 100 on the lever member 36. Engagement between the blocking surface 100 and the blocking portion 102 limits rotation of the auxiliary hook member 40 about the hook axis 52. The blocking portion 102 contacts the blocking surface 100 at a contact interface 104. Referring to FIG. 7, an imaginary line 106 extending substantially tangent to an arcuate path 108 defined by the rotational movement of the auxiliary hook member 40 about the hook axis 52, passes through the contact interface 104 and generally intersects the lever axis 44. The blocking portion 102 of the auxiliary hook member 40 is operable to engage the blocking surface 100 of the lever member 36 when the lever member 36 is positioned in the partially actuated position, in order to prevent movement of the auxiliary hook member 40 from the second partially closed position into the fully open position.

Figure 6:
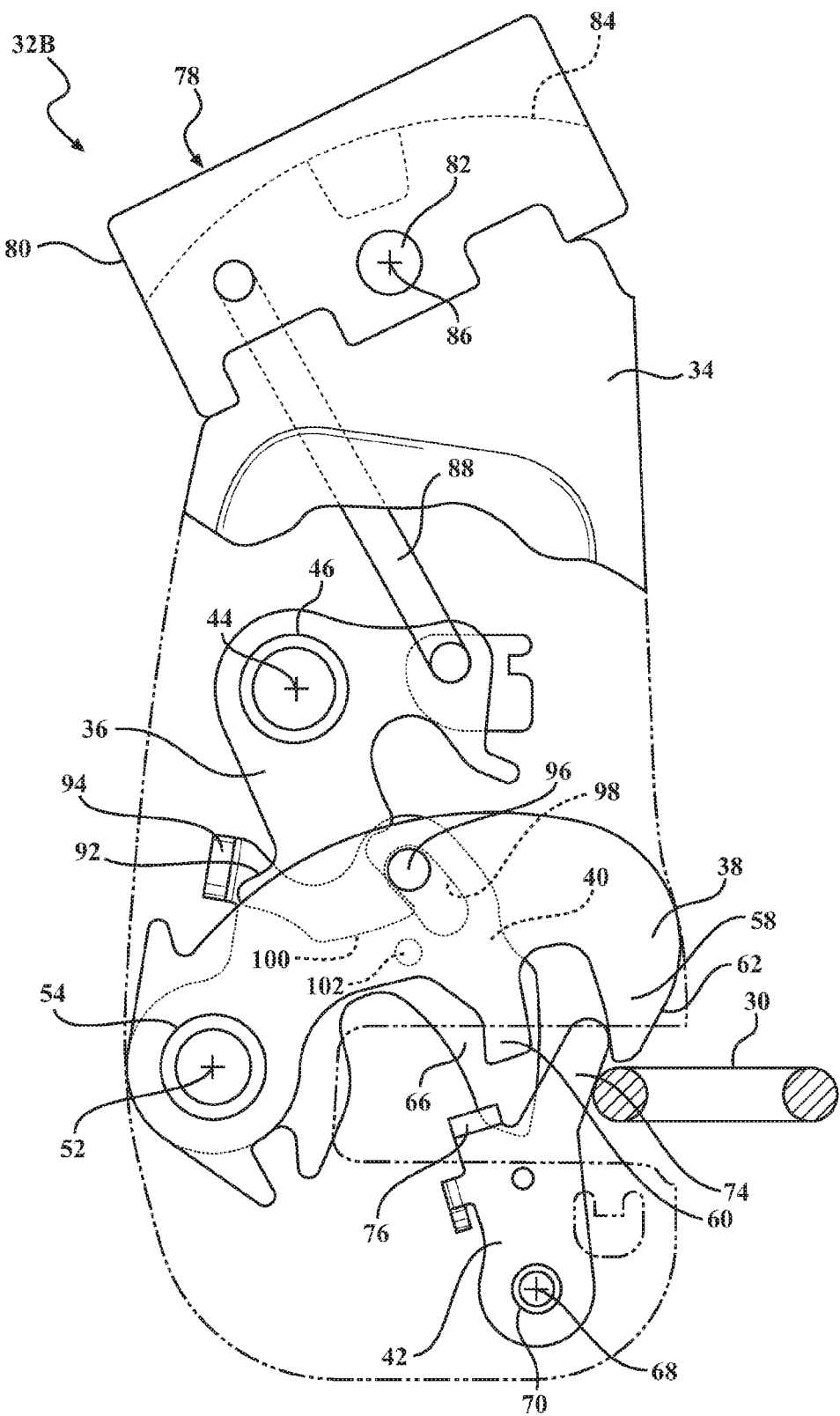
FIG. 6 is a schematic side view of the left hand side seatback latch mechanism showing the lever member in the partially actuated position, the hook member in a partially open position, the auxiliary hook member in the second partially closed position, and the assist member in-between the first position and a second position.
Figure 7:
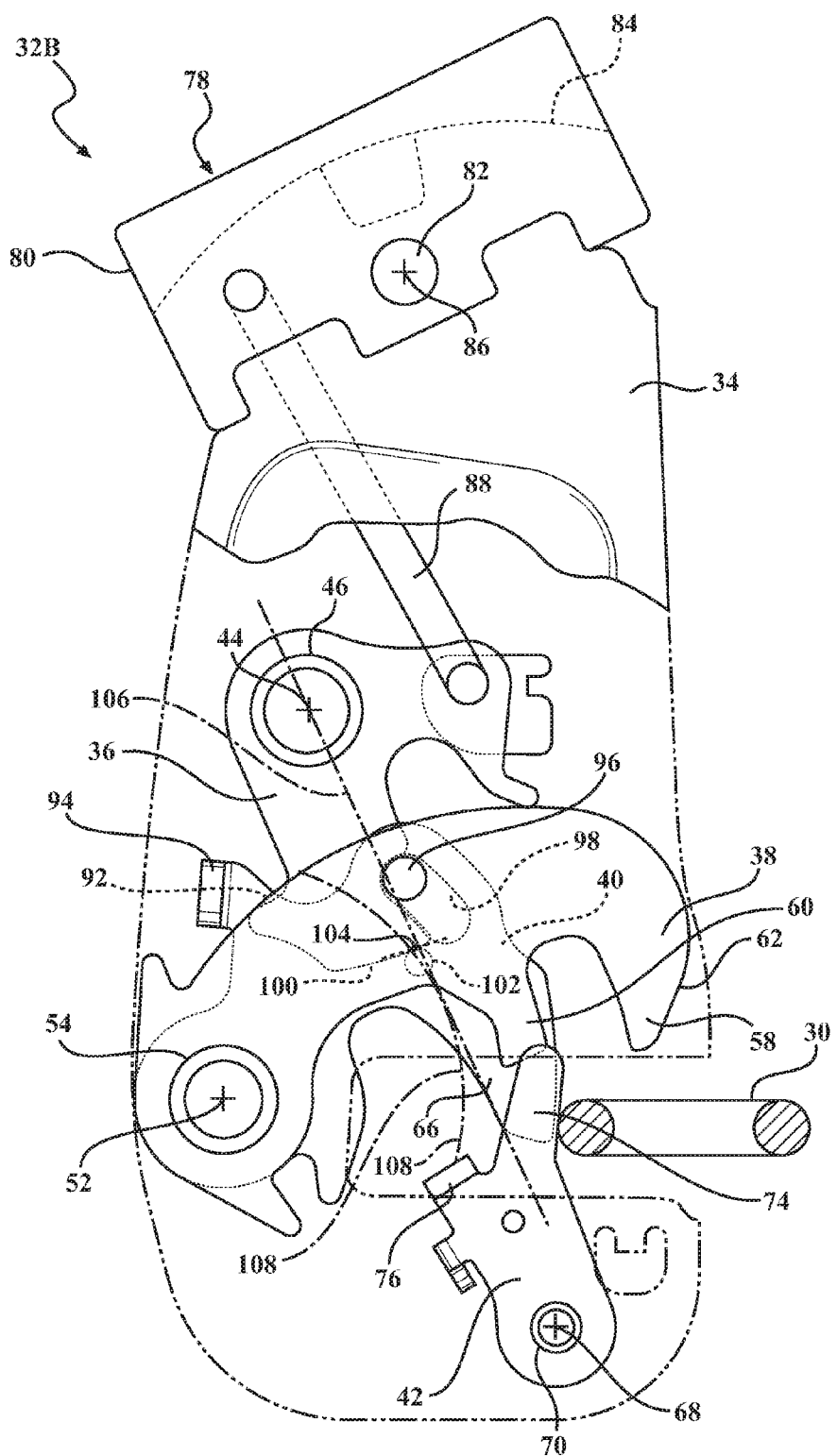
FIG. 7 is a schematic side view of the left hand side seatback latch mechanism showing the lever member in the partially actuated position, the hook member in a fully open position, the auxiliary hook member in-between the second partially closed position and a fully open position, and the assist member in the second position.

Referring to FIGS. 5-11, the different stages of operation of the second seatback latch mechanism 32B are generally shown. Referring to FIG. 5, the second seatback latch mechanism 32B is generally shown in an unactuated and disengaged state. The second seatback latch mechanism 32B is not engaged with the striker 30. FIG. 5 shows the lever member 36 in the partially actuated position, the hook member 38 in the partially closed position, the auxiliary hook member 40 in the first partially closed position, and the assist member 42 in the first position. It should be noted that the support portion 76 of the assist member 42 is engaged with the second hook portion 60 of the hook member 38, thereby preventing the hook member 38 from rotating into its respective fully closed position. The position or configuration of the second seatback latch mechanism 32B shown in FIG. 5 may represent the position of the second seatback latch mechanism 32B when the seatback 26 is rotated forward, into a generally flat, horizontal position.

As noted above, the seatback 26 may be secured to the striker 30 in either the first seatback 26 position or the second seatback 26 position. In order to secure the seatback 26 in the first seatback 26 position, a user may simply rotate the seatback 26 about the seat axis 28 until the first hook portion 58 of the hook member 38 contacts the striker 30. Upon the first hook portion 58 of the hook member 38 contacting the striker 30, the user then simply pushes the seatback 26 further, without actuating the handle mechanism 78. Referring to FIG. 6, the second seatback latch mechanism 32B is shown with the striker 30 contacting the first hook portion 58 of the hook member 38. FIG. 6 shows the lever member 36 in the partially actuated position, the hook member 38 in the partially open position, the auxiliary hook member 40 in the second partially closed position, and the assist member 42 in-between the first position and the second position. The end surface 62 of the first hook portion 58 defines a cam surface that moves the first hook portion 58 upward when pressed against the striker 30. The hook member 38 may rotate about the hook axis 52 relative to the auxiliary hook member 40, within the freedom of movement allowed by the interaction between the pin 96 of the hook member 38 within the slot 98 of the auxiliary hook member 40. FIG. 6 shows the pin 96 at the upward most limit of the slot 98. It should be noted that any further rotation of the hook member 38 about the hook axis 52, in the upward direction as shown in the page, would cause the auxiliary hook member 40 to move with the hook member 38, because the pin 96 is positioned at the uppermost limits defined by the slot 98. Accordingly, the hook member 38 cannot rotate any further relative to the auxiliary hook member 40 in the upward or opening direction. FIG. 6 further shows the striker 30 contacting the arm 74 of the assist member 42, and begins to move the assist member 42 from the first position into the second position.

If the seatback 26 is pushed toward the striker 30 quickly enough, the momentum caused by the striker 30 engaging the leading edge of the first hook portion 58 of the hook member 38 may cause the hook member 38 and the auxiliary hook member 40 to rotate about the hook axis 52 beyond the position shown in FIG. 6. Referring to FIG. 7, the second seatback latch mechanism 32B is shown in a position that may occur when the momentum of the hook member 38 moves the hook member 38 and the auxiliary hook member 40 past their respective positions shown in FIG. 6. FIG. 7 shows the lever member 36 in the partially actuated position, the hook member 38 in the fully open position, the auxiliary hook member 40 in-between the second partially closed position and the fully open position, and the assist member 42 in the second position. As shown in FIG. 7, the blocking portion 102 on the auxiliary hook member 40 is engaged with the blocking surface 100 of the lever member 36. This prevents the auxiliary hook member 40 from further rotation into the fully open position, and presents the secondary hook portion 66 of the auxiliary hook member 40 in the path of the striker 30, so that the striker 30 cannot move further into the second seatback latch mechanism 32B, and so that the second seatback latch mechanism 32B may engage the striker 30 in the first seatback 26 position. The engagement between the blocking surface 100 and the blocking portion 102 prevents the striker 30 from unintentionally skipping past the first seatback 26 position and moving into the second seatback 26 position. As described above, the blocking portion 102 contacts the blocking surface 100 at the contact interface 104. The imaginary line 106 extending substantially tangent to the arcuate path 108 defined by the rotational movement of the auxiliary hook member 40 about the hook axis 52, passes through the contact interface 104 and generally intersects the lever axis 44. This directs the resultant forces directly through the lever axis 44, thereby not applying any torque to the lever member 36, so as to not rotate the lever member 36 out of the partially actuated position. The blocking portion 102 of the auxiliary hook member 40 engages the blocking surface 100 of the lever member 36 in order to prevent movement of the auxiliary hook member 40 from the second partially closed position into the fully open position, when the lever member 36 has not been intentionally actuated.

Figure 8:
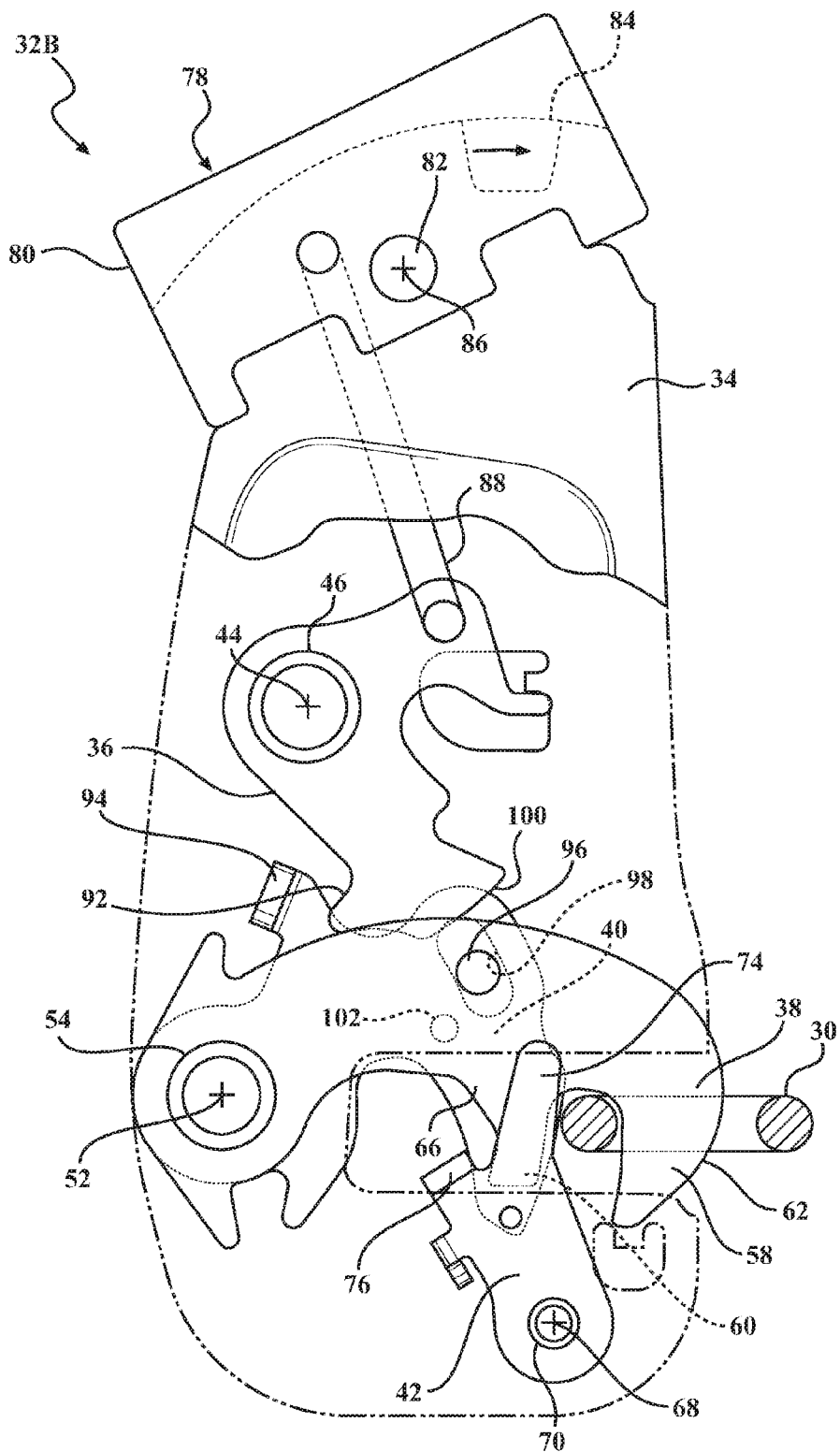
FIG. 8 is a schematic side view of the left hand side seatback latch mechanism showing the lever member in an unactuated position, the hook member in a fully closed position, the auxiliary hook member in a fully closed position, and the assist member in the second position.

FIG. 8 shows the second seatback latch mechanism 32B in interlocking engagement with the striker 30 in the first seatback 26 position. FIG. 8 shows the lever member 36 in an unactuated position, the hook member 38 in a fully closed position, the auxiliary hook member 40 in a fully closed position, and the assist member 42 in the second position. Once the second seatback latch mechanism 32B has been moved into the position shown in FIG. 6, and possibly the position shown in FIG. 7 if enough momentum was generated in the hook member 38 to move the hook member 38 and the auxiliary hook member 40 beyond the position shown in FIG. 6, the hook spring 56 biases the hook member 38 against the cover 34 to move the hook member 38 into its respective fully closed position. The auxiliary hook spring 64 biases the auxiliary hook member 40 against the hook member 38 to bias the auxiliary hook member 40 into its respective fully closed position. It should be noted that the striker 30 has also rotated the assist member 42 about the assist axis 68, so that the support portion 76 of the assist member 42 is no longer engaged with the second hook portion 60 of the hook member 38, thereby allowing the hook member 38 to rotate into its respective fully closed position.

Figure 9:
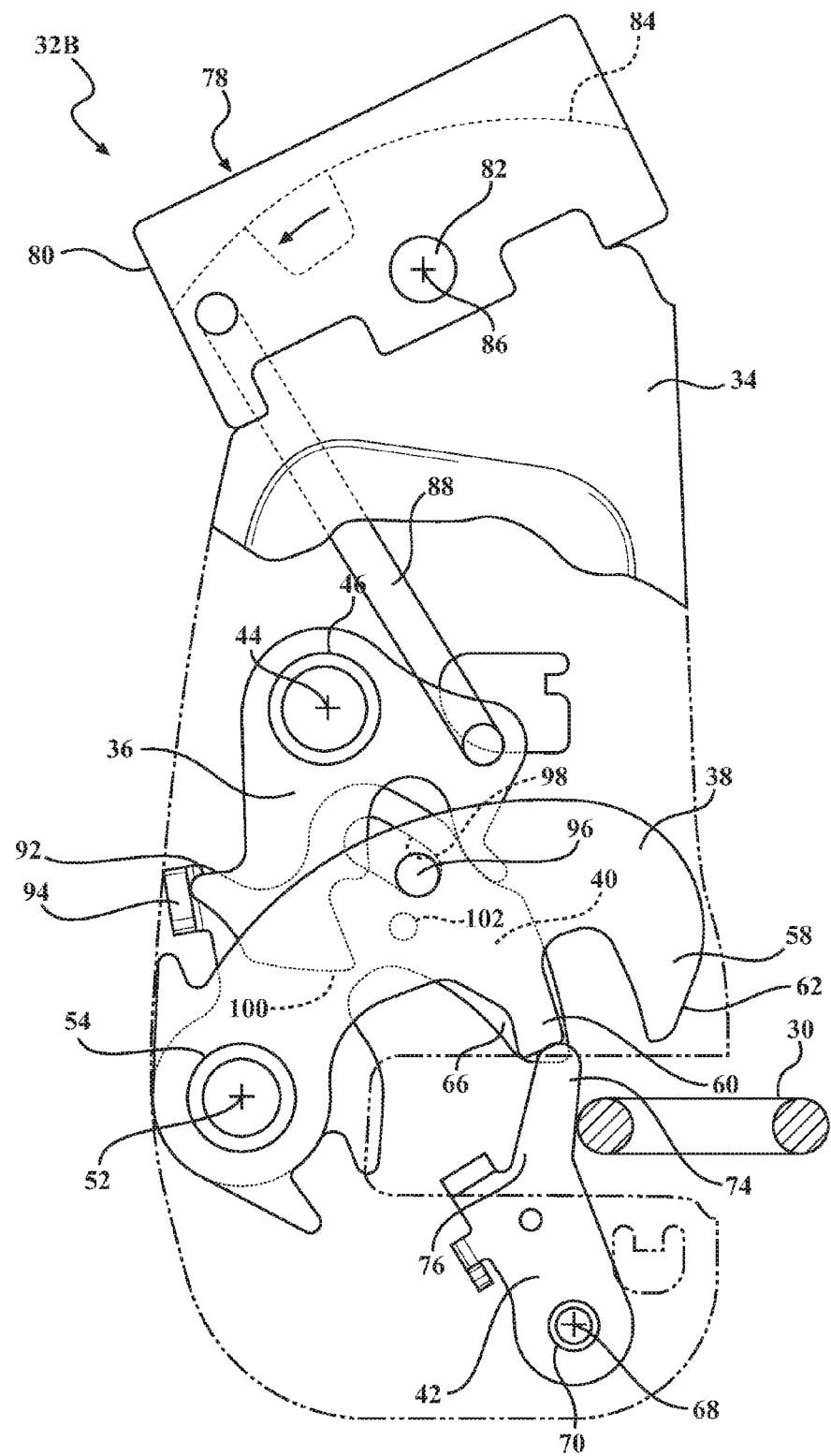
FIG. 9 is a schematic side view of the left hand side seatback latch mechanism showing the lever member in a fully actuated position, the hook member in the fully open position, the auxiliary hook member in the fully open position, and the assist member in the second position.

In order to move the seatback 26 into the second seatback 26 position, the handle mechanism 78 must be manually actuated in order to move the hook member 38 and the auxiliary hook member 40 into their respective fully open positions. FIG. 9 shows the lever member 36 in the fully actuated position, the hook member 38 in the fully open position, the auxiliary hook member 40 in a fully open position, and the assist member 42 in the second position. Rotation of the handle member 84 about the handle axis 86 causes the linkage 88 to move in a downward direction, which causes the lever member 36 to rotate about the lever axis 44 into the fully actuated position. Engagement between the ledge 92 of the lever member 36 and the tab 94 on the auxiliary hook member 40 causes the auxiliary hook member 40 to rotate about the hook axis 52. Notably, rotation of the lever member 36 into the fully actuated position moves the blocking surface 100 on the lever member 36 into a position that does not engage the blocking portion 102 of the auxiliary hook member 40. Accordingly, the auxiliary hook member 40 is free to move into its respective fully open position, because the blocking portion 102 does not engage the blocking surface 100 when the lever member 36 is positioned in its fully actuated position. FIG. 9 shows the pin 96 positioned at a lowermost limit of the slot 98, and therefore, moves upward with the auxiliary hook member 40 into its respective fully open position. FIG. 9 shows the second seatback latch mechanism 32B in a position that will enable the seatback 26 to be moved relative to the striker 30 and position the seatback 26 in the second seatback 26 position.

Figure 10:
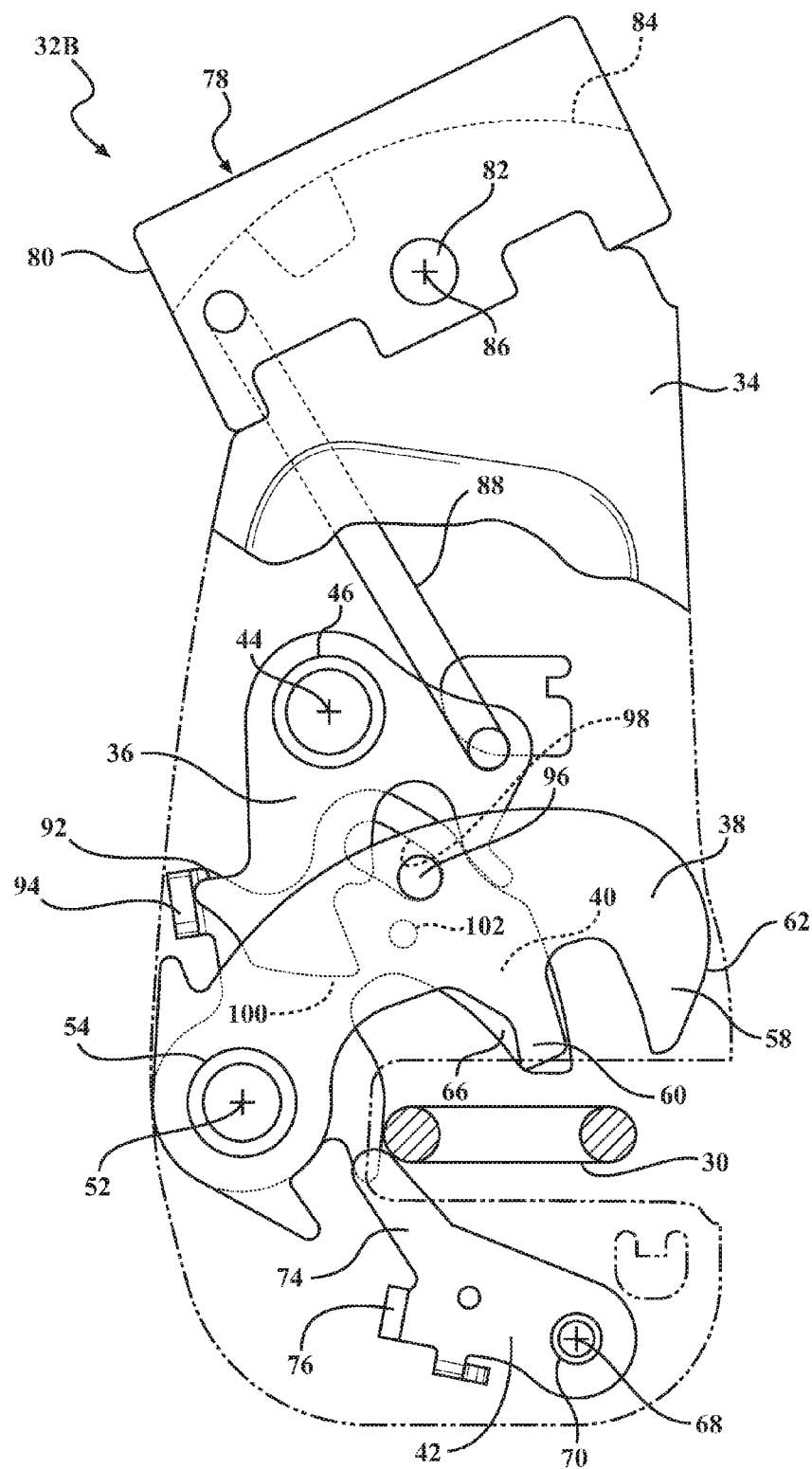
FIG. 10 is a schematic side view of the left hand side seatback latch mechanism showing the lever member in the fully actuated position, the hook member in the fully open position, the auxiliary hook member in the fully open position, and the assist member in a third position.

Upon the handle mechanism 78 being actuated to move the lever member 36 into its fully actuated position, shown in FIG. 9, the seatback 26 may be rotated about the seat axis 28 into the second seatback 26 position, shown in FIG. 10. FIG. 10 shows the lever member 36 in the fully actuated position, the hook member 38 in its respective fully open position, the auxiliary hook member 40 in its respective fully open position, and the assist member 42 in the third position. As the second seatback latch mechanism 32B is moved toward the striker 30, the striker 30 engages the arm 74 and rotates the assist member 42 into the third position. Notably, the handle mechanism 78 is still being manually actuated to hold the hook member 38 and the auxiliary hook member 40 in their respective fully open positions.

Figure 11:
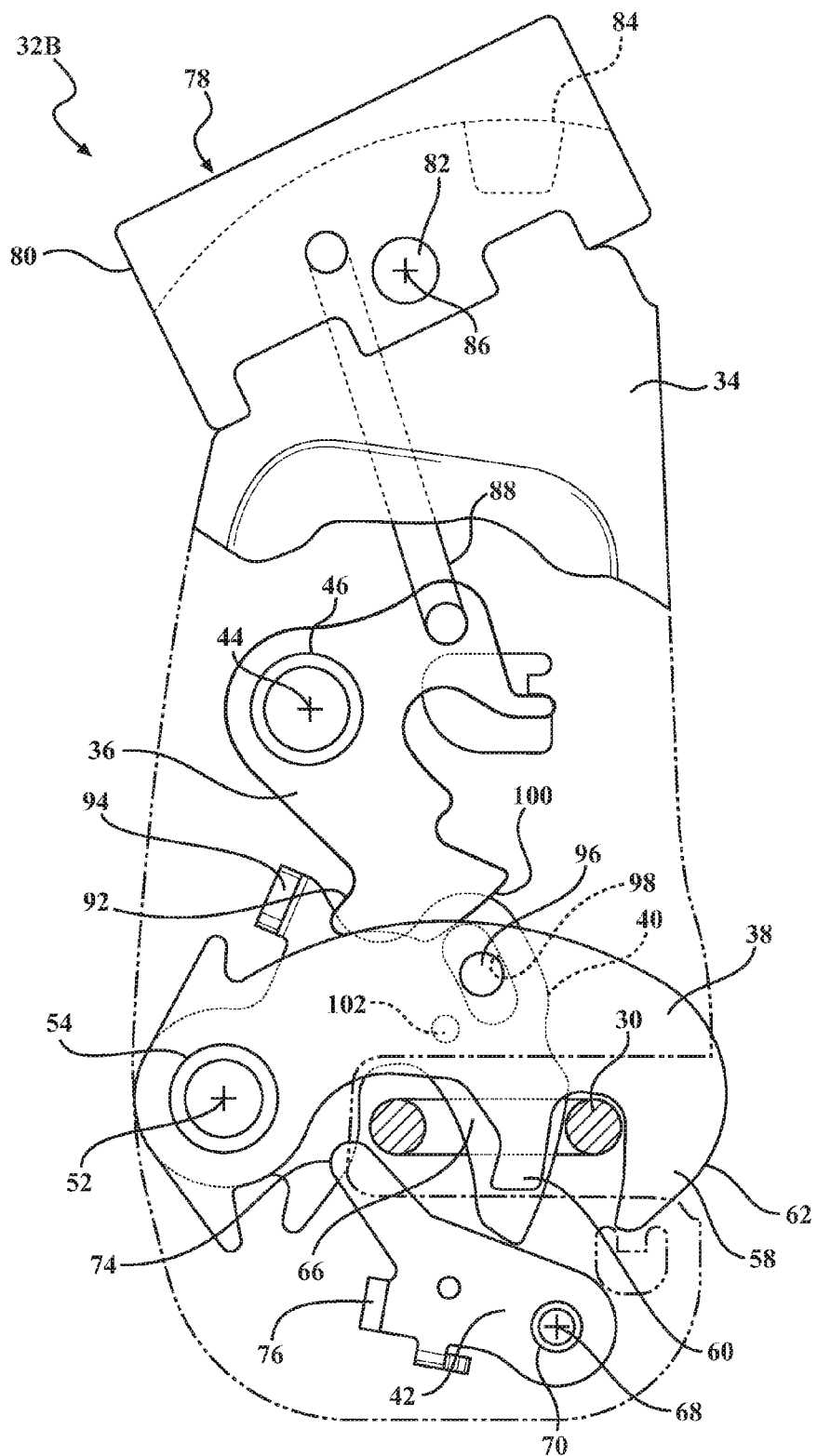
FIG. 11 is a schematic side view of the left hand side seatback latch mechanism showing the lever member in the unactuated position, the hook member in the fully closed position, the auxiliary hook member in the fully closed position, and the assist member in the third position.

Upon the second seatback latch mechanism 32B being moved into the second seatback 26 position, relative to the striker 30, the handle mechanism 78 may be released to secure the striker 30 relative to the second seatback latch mechanism 32B. FIG. 11 shows the second seatback latch mechanism 32B latched to the striker 30 in the second seatback 26 position. FIG. 11 shows the lever member 36 in the unactuated position, the hook member 38 in its respective fully closed position, the auxiliary hook member 40 in its respective fully closed position, and the assist member 42 in the third position. Releasing the handle mechanism 78 allows the lever spring 50 to move the lever member 36 into is unactuated position. Because the ledge 92 of the lever member 36 is engaged with the tab 94 on the auxiliary hook member 40, rotation of the lever member 36 into the unactuated position allows the auxiliary hook member 40 and the hook member 38 to rotate into their respective closed positions. Because the assist member 42 is rotated into its third position, the support portion 76 of the assist member 42 is not engaged with or blocking movement of the second hook portion 60 of the hook member 38, thereby allowing the hook spring 56 to move the hook member 38 into its respective fully closed position. The auxiliary hook spring 64 also moves the auxiliary hook member 40 into its respective fully closed position.

When the second seatback latch mechanism 32B is engaged with the striker 30 in interlocking engagement in the second seatback 26 position, such as shown in FIG. 11, actuation of the handle mechanism 78 to move the lever member 36 into the fully actuated position, such as shown in FIG. 10, releases the striker 30, and allows the seatback 26 to be moved out of interlocking engagement with the striker 30.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A seatback latch mechanism comprising:
   a cover;
   a lever member rotatably supported by the cover and rotatable about a lever axis, wherein the lever member presents a blocking surface;
   a hook member rotatably supported by the cover and rotatable about a hook axis, wherein the hook member includes a pin; and
   an auxiliary hook member rotatably supported by the cover and rotatable about the hook axis, wherein the auxiliary hook member defines a slot, with the pin extending through the slot such that the slot limits movement of the pin to limit relative movement between the hook member and the auxiliary hook member;
   wherein the auxiliary hook member includes a blocking portion operable to engage the blocking surface on the lever member, when the lever member is disposed in a pre-defined position, to limit rotation of the auxiliary hook member about the hook axis.

2. The seatback latch mechanism set forth in claim 1, wherein the blocking portion contacts the blocking surface at a contact interface, such that a line extending substantially tangent to an arcuate path defined by the rotational movement of the auxiliary hook member about the hook axis passes through the contact interface and intersects the lever axis.

3. The seatback latch mechanism set forth in claim 1, wherein:
   the lever member is rotatable between a fully actuated position, a partially actuated position, and an unactuated position;

the hook member is rotatable between a fully closed position, a partially closed position, a partially open position, and a fully open position;

the auxiliary hook member is rotatable between a fully closed position, a first partially closed position, a second partially closed position, and a fully open position.

4. The seatback latch mechanism set forth in claim 3, wherein the blocking portion of the auxiliary hook member is operable to engage the blocking surface of the lever member when the lever member is positioned in the partially actuated position to prevent movement of the auxiliary hook member from the second partially closed position into the fully open position.

5. The seatback latch mechanism set forth in claim 3, further comprising a lever spring biasing against the lever member and the cover to urge the lever member into the unactuated position of the lever member.

6. The seatback latch mechanism set forth in claim 3, further comprising a hook spring biasing against the hook member and the cover to urge the hook member into the fully closed position of the hook member.

7. The seatback latch mechanism set forth in claim 3, further comprising an auxiliary hook spring biasing against the auxiliary hook member and one of the hook member or the cover to urge the auxiliary hook member into the fully closed position of the auxiliary hook member.

8. The seatback latch mechanism set forth in claim 1, further comprising an assist member rotatably supported by the cover and rotatable about an assist axis, between a first position, a second position, and a third position.

9. The seatback latch mechanism set forth in claim 8, further comprising an assist spring biasing against the assist member and the cover to urge the assist member into the first position of the assist member.

10. The seatback latch mechanism set forth in claim 1, further comprising a handle mechanism attached to the cover and operatively coupled to the lever member for selectively rotating the lever member about the lever axis.

11. The seatback latch mechanism set forth in claim 1, wherein the lever member is disposed between the hook member and the auxiliary hook member.

12. The seatback latch mechanism set forth in claim 11, wherein the lever member is a planar structure.

13. The seatback latch mechanism set forth in claim 1, wherein the lever member defines a ledge and the auxiliary hook member includes a tab engaged with the ledge, wherein rotational movement of the lever member about the lever axis rotates the auxiliary hook member about the hook axis.

14. The seatback latch mechanism set forth in claim 1, wherein the hook member includes a first hook portion and a second hook portion.

15. The seatback latch mechanism set forth in claim 14, wherein the auxiliary hook member includes a secondary hook portion generally aligned with the second hook portion of the hook member.

16. The seatback latch mechanism set forth in claim 14, further comprising an assist member rotatably supported by the cover and rotatable about an assist axis, between a first position, a second position, and a third position, wherein the assist member includes an arm generally aligned with the first hook portion when the hook member is positioned in a partially closed position and the assist member is positioned in the first position.

17. The seatback latch mechanism set forth in claim 16, wherein the assist member includes a support portion engaging the second hook portion of the hook member when the hook member is positioned in the partially closed position and the assist member is positioned in the first position, to prevent movement of the hook member into a fully closed position.

18. A seatback latch mechanism comprising:

a cover;

a lever member rotatably supported by the cover and rotatable about a lever axis, wherein the lever member presents a blocking surface;

a hook member rotatably supported by the cover and rotatable about a hook axis, wherein the hook member includes a pin;

an auxiliary hook member rotatably supported by the cover and rotatable about the hook axis, wherein the auxiliary hook member defines a slot, with the pin extending through the slot with the slot limiting movement of the pin to limit relative movement between the hook member and the auxiliary hook member;

wherein the lever member defines a ledge and the auxiliary hook member includes a tab engaged with the ledge, wherein rotational movement of the lever member about the lever axis rotates the auxiliary hook member about the hook axis;

wherein the auxiliary hook member includes a blocking portion operable to engage the blocking surface on the lever member to limit rotation of the auxiliary hook member about the hook axis; and wherein the blocking portion contacts the blocking surface at a contact interface, such that a line extending substantially tangent to an arcuate path defined by the rotational movement of the auxiliary hook member about the hook axis passes through the contact interface and intersects the lever axis.

19. The seatback latch mechanism set forth in claim 18, wherein the blocking portion of the auxiliary hook member is operable to engage the blocking surface of the lever member when the lever member is positioned in a partially actuated position to prevent movement of the auxiliary hook member from a second partially closed position into a fully open position.

20. A seat system comprising:

a seat structure having a seatback rotatable about a seat axis;

a striker fixed in position relative to the seat structure, with the seatback moveable relative to the striker;

a seatback latch mechanism attached to the seatback, and operable to engage the striker in interlocking engagement in one of a first seatback position or a second seatback position, the seatback latch mechanism including:

a cover;

a lever member rotatably supported by the cover and rotatable about a lever axis, wherein the lever member presents a blocking surface;

a hook member rotatably supported by the cover and rotatable about a hook axis, wherein the hook member includes a pin;

an auxiliary hook member rotatably supported by the cover and rotatable about the hook axis, wherein the auxiliary hook member defines a slot, with the pin extending through the slot with the slot limiting movement of the pin to limit relative movement between the hook member and the auxiliary hook member;

wherein the auxiliary hook member includes a blocking portion operable to engage the blocking surface on the lever member to limit rotation of the auxiliary hook member about the hook axis; and wherein the blocking portion contacts the blocking surface at a contact interface, such that a line extending substantially tangent to an arcuate path defined by the rotational movement of the auxiliary hook member about the hook axis passes through the contact interface and intersects the lever axis.

* * * * *